(12) United States Patent
Olds

(10) Patent No.: US 8,915,509 B2
(45) Date of Patent: Dec. 23, 2014

(54) BOAT TRAILER BOW MOUNT STEP

(71) Applicant: Morris Olds, Wisconsin Rapids, WI (US)

(72) Inventor: Morris Olds, Wisconsin Rapids, WI (US)

(*) Notice: Subject to any disclaimer, the term of this patent is extended or adjusted under 35 U.S.C. 154(b) by 0 days.

(21) Appl. No.: 14/070,633

(22) Filed: Nov. 4, 2013

(65) Prior Publication Data

US 2014/0131976 A1 May 15, 2014

Related U.S. Application Data

(60) Provisional application No. 61/725,682, filed on Nov. 13, 2012.

(51) Int. Cl.
B60R 3/02 (2006.01)
B60P 3/10 (2006.01)

(52) U.S. Cl.
CPC .................................. B60P 3/1066 (2013.01)
USPC ........................................................ 280/163

(58) Field of Classification Search
USPC .......................... 280/163–166, 291; 248/689; 182/130–132
See application file for complete search history.

(56) References Cited

U.S. PATENT DOCUMENTS

| 4,056,270 A | 11/1977 | Greenfield |
| 4,943,076 A | 7/1990 | Tripke |
| D313,388 S | 1/1991 | Dale |
| D371,336 S | 7/1996 | Wilson |
| 5,799,961 A | 9/1998 | Schmeets |
| D456,747 S | 5/2002 | Louie |
| 6,523,846 B1 | 2/2003 | Bennett et al. |
| 6,932,193 B2 | 8/2005 | Tombarello |
| 7,390,003 B1 | 6/2008 | Sylvia |
| 7,410,031 B2 * | 8/2008 | Jensen .......................... 182/127 |
| 2005/0039983 A1 | 2/2005 | Tombarello |
| 2010/0059966 A1 * | 3/2010 | Ireland ....................... 280/414.1 |
| 2011/0011675 A1 | 1/2011 | Ebbenga |

* cited by examiner

Primary Examiner — John Walters
Assistant Examiner — James Triggs
(74) Attorney, Agent, or Firm — Buckingham Doolittle & Burroughs, LLC

(57) ABSTRACT

The subject matter disclosed and claimed herein, in one aspect thereof, is an improved boat trailer bow mount step device that can be attached to an existing boat trailer and that enables a user to more easily and safely access the bow portion of a boat. In a first preferred embodiment of the present invention, the improved bow mounted step may be comprised of a neck portion, a cross beam, two step portions to enable an individual to access the bow of a boat from either side, a mounting bracket, and a fastening means for securing said step device to a boat trailer and/or a winch post. In a second preferred embodiment of the present invention, the improved bow mounted step may be comprised of a cross beam, two step portions, and a pair of spaced apart mounting brackets and fasteners for mounting said device to a frame tongue.

5 Claims, 7 Drawing Sheets

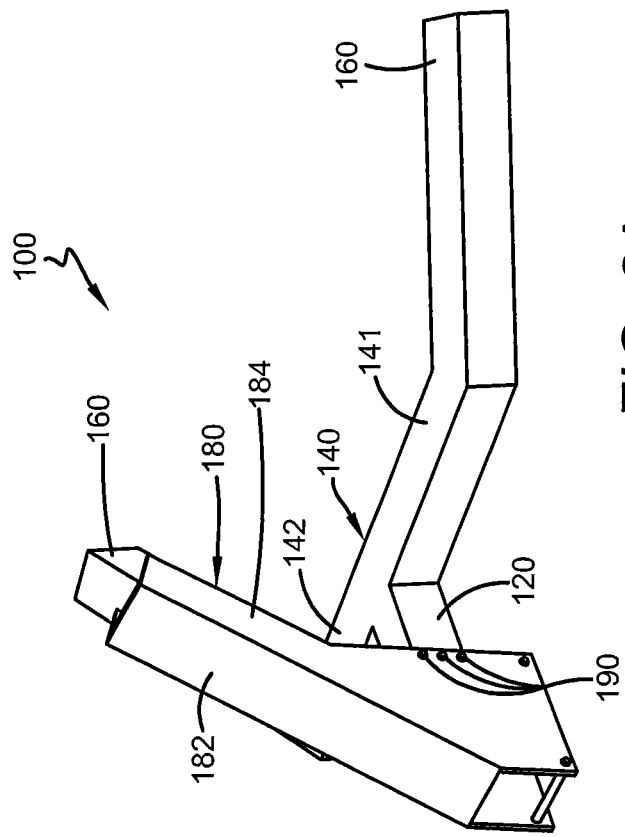
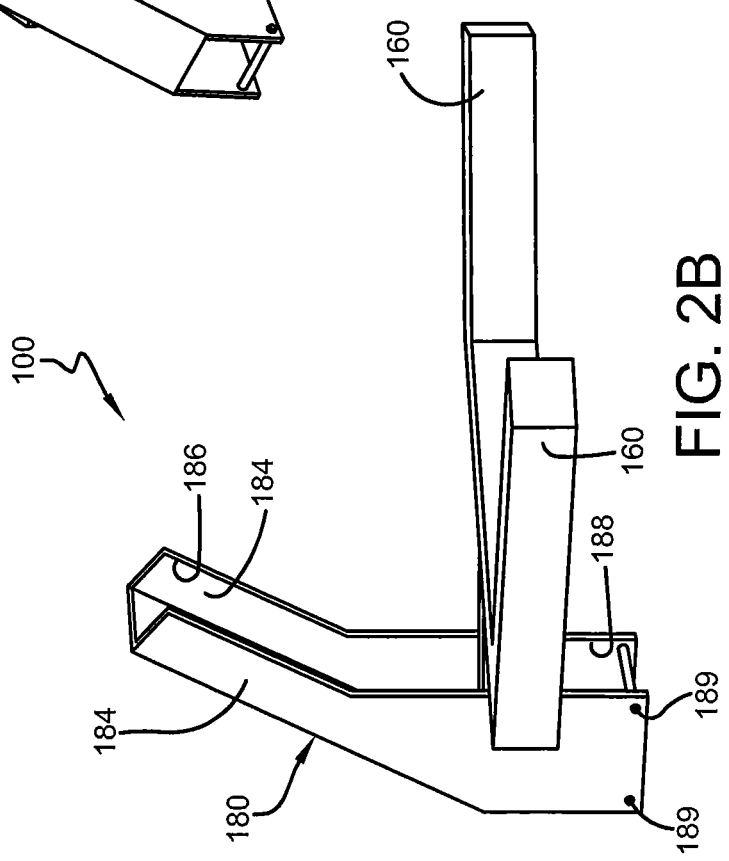

BOAT TRAILER BOW MOUNT STEP

CROSS-REFERENCE

This application claims priority from Provisional Patent Application Ser. No. 61/725,682 filed on Nov. 13, 2012.

FIELD OF THE INVENTION

This invention relates to a bow mount step for a trailer such as a boat trailer.

BACKGROUND

Oftentimes, individuals desire to board a boat from the front, or bow, of the boat, despite the existence of a ladder or step at the rear, or stern, of the boat. For example it may not be possible or feasible to board the boat from the rear when the boat is partially in the water during the loading or unloading of the boat at a ramp or dock. However, it can also be both dangerous and difficult to climb into the front of a boat, even when the boat is parked at a landing or on dry land. For example, an individual could slip or fall when attempting to board a boat at the bow, and become seriously injured. This is oftentimes due, in large part, to the absence of a step or other access assistance device at the bow of the boat and/or the front of the trailer.

Consequently, there exist in the art a long felt need for a boat trailer bow mount step that enables an individual to board a boat at the bow of the boat. There also exists in the prior art a long felt need for a bow mount step that can be securely attached to the top of an existing trailer frame tongue, or that can be integrally formed with a newly manufactured boat trailer. Finally, there is a long-felt need for a bow mount step that accomplishes all of the forgoing objectives and that is relatively inexpensive to manufacture, and safe and easy to use.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, is a bow mount step for attachment to the frame tongue of an existing boat trailer, or that can be integrally formed with a newly manufactured boat trailer. The bow mount step is useful for enabling an individual to safely and easily board or de-board a boat at the bow of the boat. In a first preferred embodiment of the present invention, the bow mount step device is comprised of a neck portion, a cross beam, at least one step portion connected to said cross beam, and a mounting bracket. In a further preferred embodiment the present invention, the bow mount step device comprises two step portions attached to the cross beam (one on each side), to allow an individual the access the boat from either side of the bow.

In a second preferred embodiment of the present invention, the bow mount step device is comprised of a cross beam, at least one, and preferably two, step portion(s) connected to said cross beam, a pair of spaced apart mounting brackets and a plurality of fasteners for attaching the device to a frame tongue on an existing boat trailer. As stated above, the presence of two step portions attached to the cross beam (one on each side), allows an individual the access the boat from either side of the bow.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 2A is a perspective view of a first preferred embodiment of the bow mount step device of the present invention.

FIG. 2B is a perspective view of a first preferred embodiment of the bow mount step device of the present invention.

DETAILED DESCRIPTION

Figure 1:
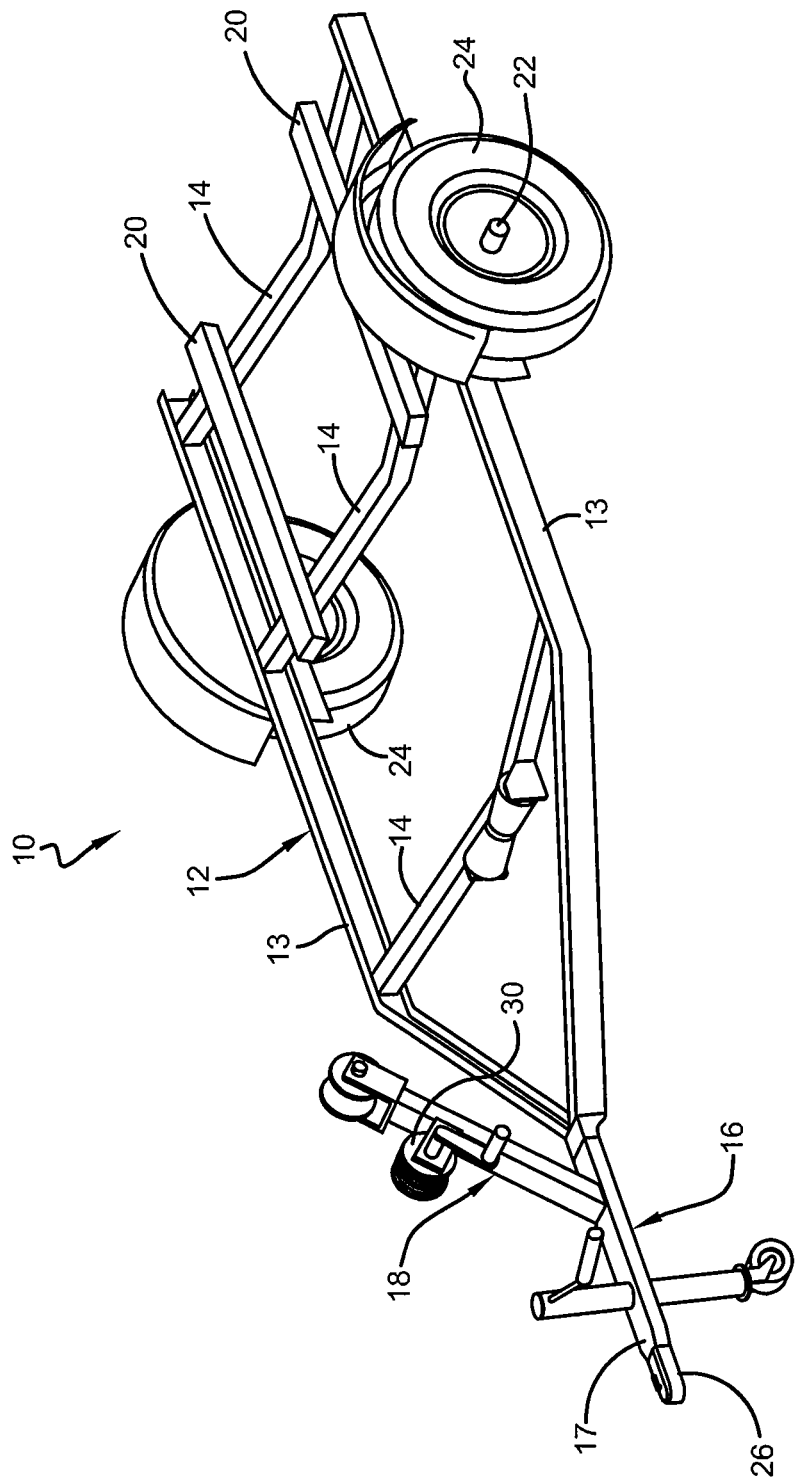
FIG. 1 is a perspective view of a prior art boat trailer.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details.

Referring initially to the drawings, FIG. 1 is a perspective view of a prior art boat trailer 10. Prior art boat trailer 10 is typically comprised of a frame 12, a frame tongue 16, a winch post 18, one or more boat supports 20, one or more axles 22, two or more wheels 24, a trailer hitch 26, and a winch 30. More specifically, frame 12 is preferably comprised of two or more spaced apart longitudinal members 13 and one or more cross members 14 fixedly attached to, and extending between, each of said longitudinal members 13. Cross member 14 may be attached to longitudinal members 13 by any means commonly known in the art such as by welding, bolts, or other fasteners. Longitudinal members 13 and cross members 14 are preferably comprised of elongated box tubing channels or I-beams, as is well known in the art.

Frame tongue 16 is typically an elongated member comprised of box tubing that extends outwardly from the bow portion of prior art frame 12 as shown in FIG. 1, and is further comprised of a top surface 17. Frame tongue 16 may be attached to frame 12 by any common means known in the art such as by welding, bolts, or other fasteners.

Winch post 18 is typically an elongated member, also comprised of box tubing, I-beam, or channel, that extends upwardly and inwardly (i.e. in the direction of the boat 200 positioned on prior art trailer 10) from frame tongue 16, as best shown in FIG. 1. Winch post 18 is further comprised of a first end 1810, located at the junction of winch post 18 and frame tongue 16, and an opposing second end 1820. More specifically, first end 1810 of winch post 18 is typically fixedly attached to top surface 17 of frame tongue 16 by any means commonly known in the art such as welding, bolts, and other fasteners.

Boats supports 20 are typically elongated members attached to the top side of frame 12 and are useful for supporting boat 200 during periods of transportation and/or storage. Boats supports 20 are well known in the art, and may further comprise a covering thereon (not shown) for protecting both the surface of the boat supports 20, as well as the surface of the underside of boat 200.

As previously mentioned, prior art trailer 10 is also comprised of one or more axles 22 attached to the underside of trailer frame 12 for distributing the bulk of the weight of trailer 10, boat 200 and its contents to two or more wheels 24 that are attached to the ends of axles 22, all of which is well known in the art. Wheels 24 enable prior art trailer 10 to be transported from one location to another location.

Trailer hitch 26 is also well known in the art and is typically located at the outer most end of frame tongue 16, and can be used to hitch or attach prior art trailer 10 to a motor vehicle, such as a truck or car, for pulling or towing trailer 10 and boat 200 from one location to anther location. Trailer hitch 26 is typically attached to frame tongue 16 by any means commonly known in the art such as welding, bolts, or other fasteners.

Winch 30 may be any type of winch commonly known in the art for pulling an article in the direction of the winch. On prior art trailer 10, winch 30 is typically located at the second end 1820 of winch post 18 and is useful for loading a prior art boat 200 onto the boat supports 20 of prior art trailer 10, such as when taking a boat out of the water.

Notwithstanding the forgoing, it should be appreciated by one of ordinary skill in the art that the foregoing general description of prior art trailer 10 is merely one embodiment of prior art trailer 10, and that prior art trailers 10 can be produced in a wide variety of different embodiments to suit a particular application or user preference. Accordingly, the foregoing general description of prior art trailer 10 should not be construed as a limitation on the present invention.

Having now described the general structure of a prior art trailer 10, a first preferred embodiment of bow mount step device 100 of the present invention is described as follows. FIGS. 2A and 2B are perspective views of a preferred embodiment of the bow mount step device 100 of the present invention, which is comprised of a neck portion 120, a cross beam 140, one or more step portions 160, and a mounting bracket 180. Unless otherwise stated herein, device 100 and its various components are preferably formed of durable box tubing (similar to prior art trailer frame 12), though it is contemplated that other frame members or configurations, such as I-beams, channels, and the like, could also be used without affecting the overall concept of the present invention.

Figure 4:
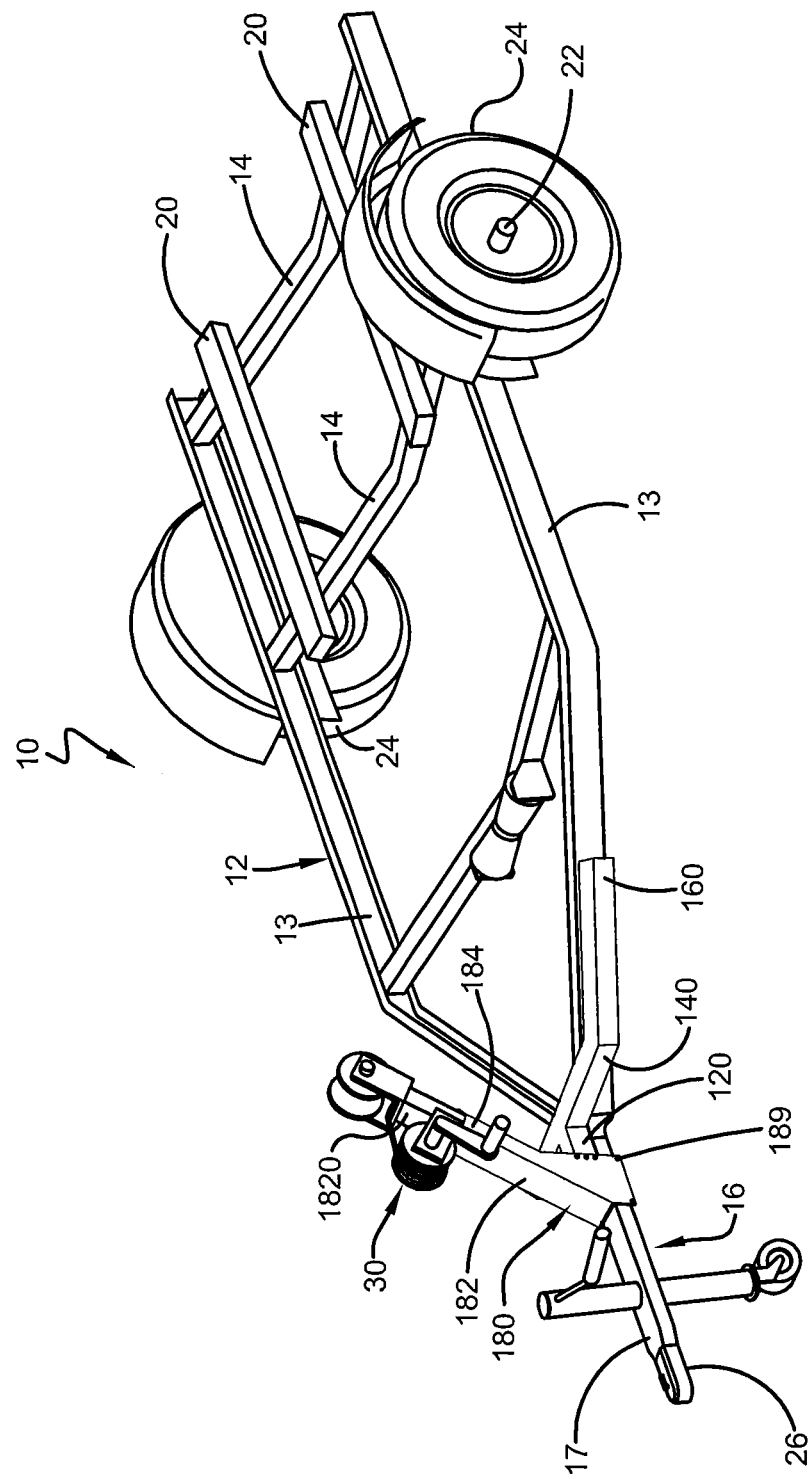
FIG. 4 illustrates a perspective view of the prior art boat trailer of FIG. 1 with the bow mount step device of FIGS. 2A and 2B mounted thereon.
Figure 5:
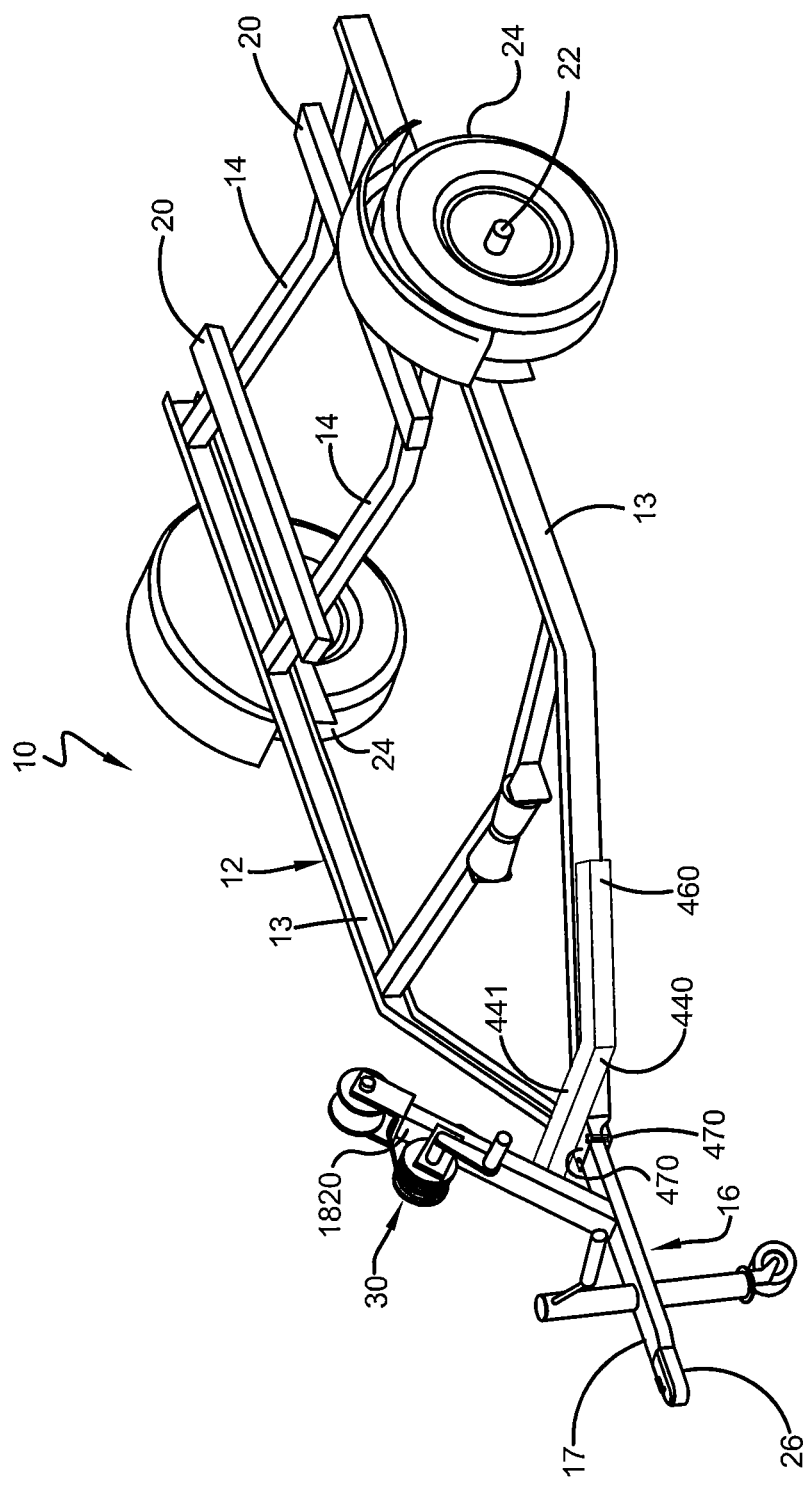
FIG. 5 illustrates a perspective view of the prior art boat trailer of FIG. 1 with the bow mount step device of FIGS. 3A and 3B mounted thereon.
Figure 6:
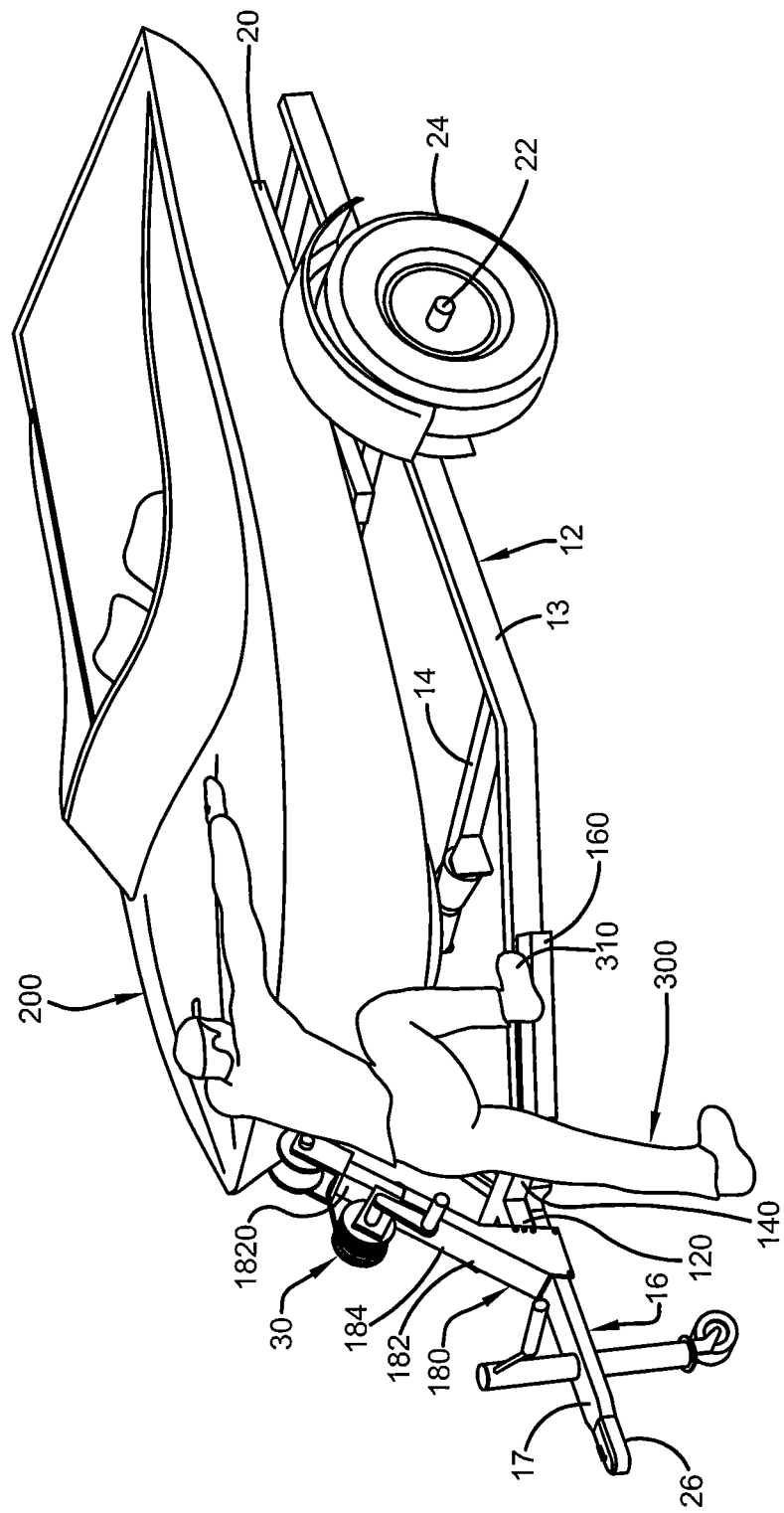
FIG. 6 illustrates a perspective view of the prior art boat trailer of FIG. 1 with a boat and the bow mount step device of FIGS. 2A and 2B mounted thereon, as well as a user accessing the boat via the bow mount step device.

Neck portion 120 is preferably comprised of an elongated section of durable box tubing that extends between and connects cross beam 140 to mounting bracket 180, as further described below. Neck portion 120 may be integrally formed with cross beam 140 and step portion(s) 160 as a single unit, or neck portion 120 may be fixedly attached to cross beam 140 by any common means known in the art such as via welds or traditional type fasteners, such as nuts and bolts. In a preferred embodiment of the present invention, neck portion 120 is generally parallel to, and rests on top of, frame tongue 16 of prior art trailer 10, as shown in FIGS. 4 and 6. In a further preferred embodiment of the present invention, neck portion 120 is generally perpendicular to and extends outwardly (in the direction of trailer hitch 26) from the midsection of cross beam 140.

Cross beam 140 is preferably formed of an elongated section of durable box tubing and comprised of a first end 141 and an opposing second end 142. As previously mentioned, cross beam 140 connects neck portion 120 to step portion(s) 160 and may be integrally formed therewith. In a preferred embodiment, cross beam 140 is preferably between 20 and 21 inches in length, as measured between first end 141 and second end 142, though it is contemplated that other lengths could also be used to accommodate a particular application or suit user preference. As explained more fully below, cross beam 140 may rest atop of prior art boat trailer frame 12 for further support.

Each of one or more step portions 160 is also preferably comprised of an elongated section of durable box tubing. In the preferred embodiment of the present invention shown in FIGS. 2A and 2B, one step portion 160 extends outwardly (i.e., away from the boat trailer and towards the stern of the boat trailer) at an angle from first end 141 of cross beam 140, and a second step portion 160 extends outwardly (i.e., away from the boat trailer and towards the stern of the boat trailer) at an angle from second end 142 of cross beam 140. While the angle between step portion 160 and cross beam 140 may vary to suit user preference of accommodate a particular application, an angle of between 130 and 135 degrees is preferred. In this manner, a user 300 could easily and safely step on either step portion 160 and access the bow of boat 200 from either side of boat 200. As previously mentioned, step portion(s) 160 may be integrally formed with cross beam 140 or attached thereto by any means commonly known in the art, such as through welds and/or traditional fasteners, such as nuts and bolts.

Mounting bracket 180 is preferably further comprised of a top portion 182, spaced apart and generally parallel side portions 184 that, together with top portion 182 form both a winch post channel 186 and a frame tongue channel 188, as further described below, and one or more pins 189. More specifically, top portion 182 and side portions 184 are sized and shaped to form a winch post channel 186 for receipt of winch post 18, as is best shown in FIGS. 4 and 6. Similarly, top portion 182, side portions 184, the bottom side of neck portion 120 and one or more pins 189 form frame tongue channel 188 for receipt of a portion of frame tongue 16, as is best shown in FIGS. 4 and 6. In this manner, a portion of frame tongue 16 is secured between pins 189 on the bottom, side portions 184 on the sides of frame tongue 16 and neck portion 120 on the top surface 17 or frame tongue 16. In an effort to further secure bow mount step device 100 to prior art boat trailer 10, additional fastening means, such as welds or traditional fasteners (nuts and bolts, rivets, etc.) may also be employed. For example, and as is shown in FIG. 2A, a plurality of fasteners 190 may also be used to fixedly attach the side portions 184 of mounting bracket 180 to the neck portion 120. Of course, welds and/or additional fasteners or fastening means could also be employed in different locations to further secure bow mount step device 100 to prior art boat trailer 10 and suit user preference. For example, it is also contemplated that pins 189 could be inserted through openings (not shown) in frame tongue 16.

Figure 3B:
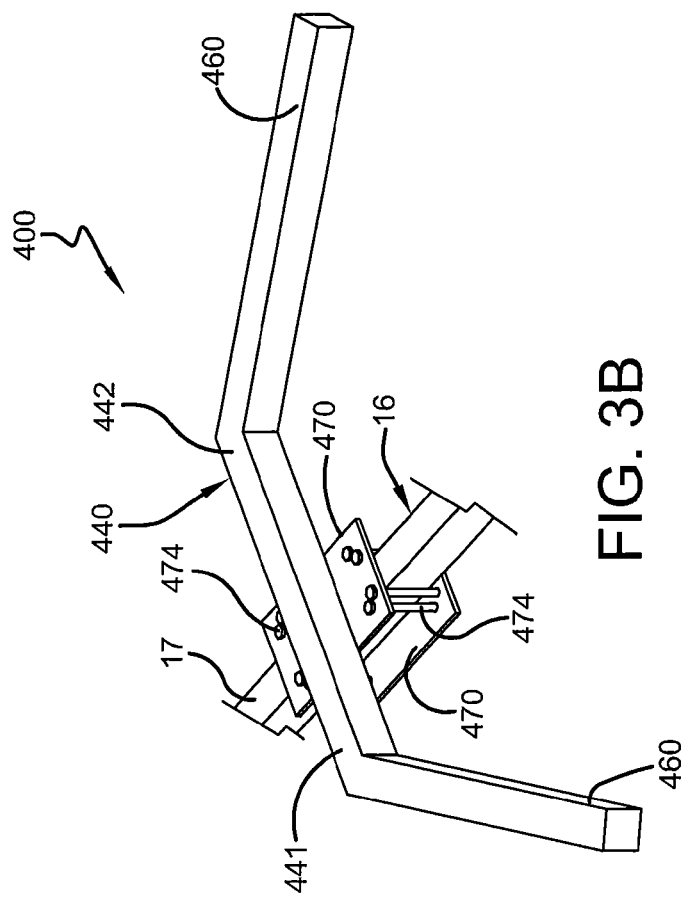
FIG. 3B is a perspective view of a second preferred embodiment of the bow mount step device of the present invention.
Figure 3A:
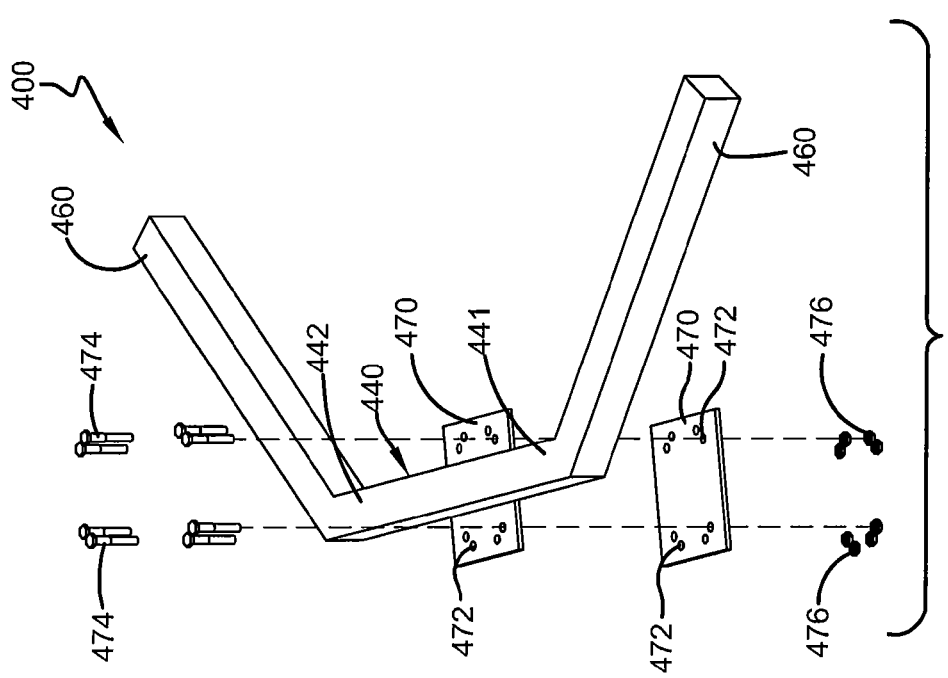
FIG. 3A is a perspective view of a second preferred embodiment of the bow mount step device of the present invention.

FIGS. 3A and 3B are perspective views of a second preferred embodiment of the bow mount step device 400 of the present invention, which is comprised of a cross beam 440, one or more step portions 460, a pair of spaced apart mounting brackets 470 and a plurality of fasteners 474 and corresponding nuts 476 for attaching said device to frame tongue 16. Unless otherwise stated herein, device 400 and its various components are preferably formed of durable box tubing (similar to prior art trailer frame 12), though it is contemplated that other frame members or configurations, such as I-beams, channels, and the like, could also be used without affecting the overall concept of the present invention.

Cross beam 440 is preferably formed of an elongated section of durable box tubing and comprised of a first end 441 and an opposing second end 442. In a preferred embodiment, cross beam 440 is preferably between 20 and 21 inches in length, as measured between first end 441 and second end 442, though it is contemplated that other lengths could also be used to accommodate a particular application or suit user preference.

Each of one or more step portions 460 is also preferably comprised of an elongated section of durable box tubing. In the preferred embodiment of the present invention shown in FIGS. 3A and 3B, one step portion 460 extends outwardly (i.e., away from the boat trailer and towards the stern of the boat trailer) at an angle from first end 441 of cross beam 440, and a second step portion 460 extends outwardly (i.e., away from the boat trailer and towards the stern of the boat trailer) at an angle from second end 442 of cross beam 440. While the angle between step portion 460 and cross beam 440 may vary to suit user preference of accommodate a particular application, an angle of between 130 and 135 degrees is preferred. In this manner, a user 300 could easily and safely step on either step portion 460 and access the bow of boat 200 from either side of boat 200. As previously mentioned, step portion(s) 460 may be integrally formed with cross beam 440 or attached thereto by any means commonly known in the art, such as through welds and/or traditional fasteners, such as nuts and bolts.

Figure 7:
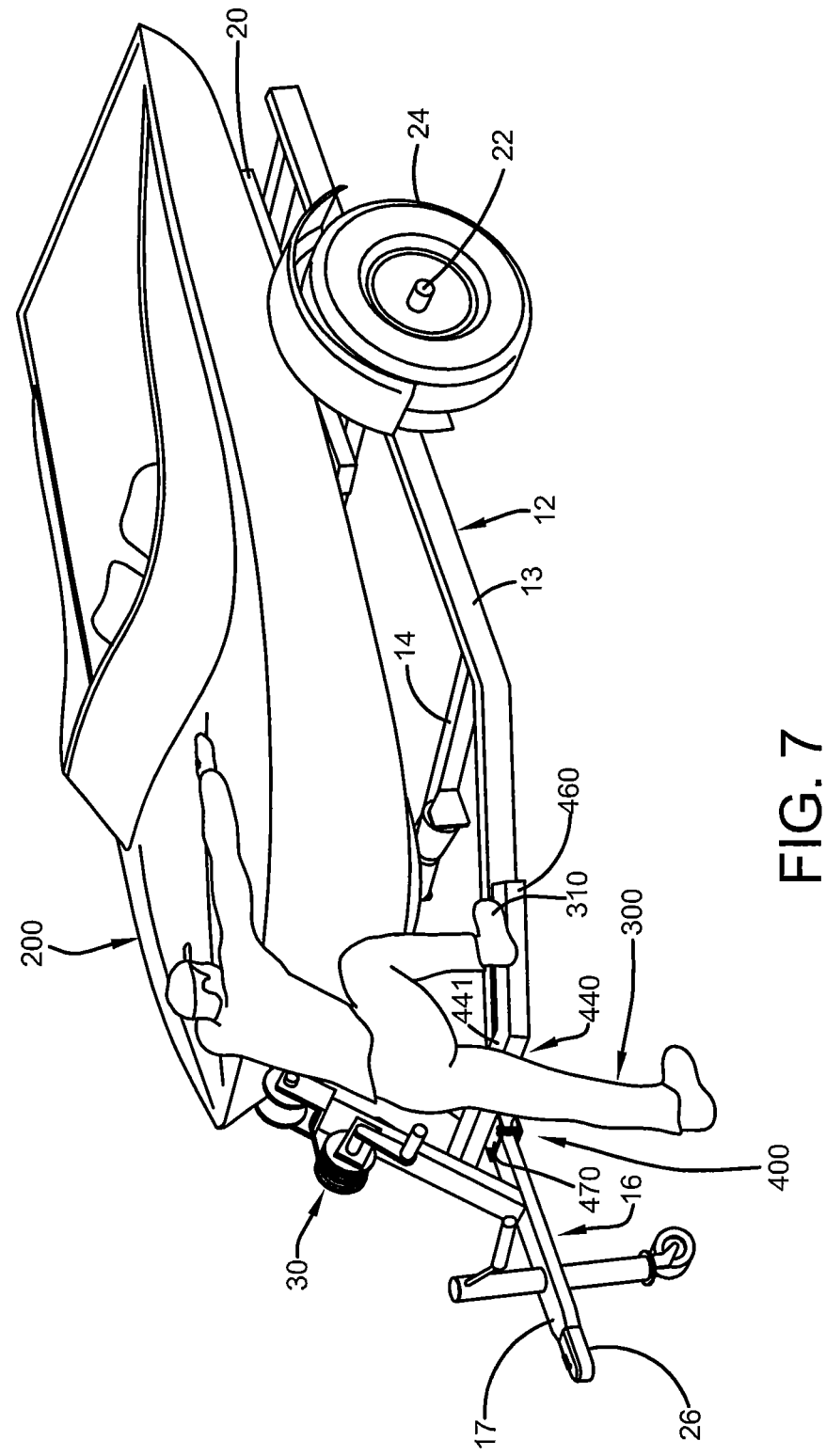
FIG. 7 illustrates a perspective view of the prior art boat trailer of FIG. 1 with a boat and the bow mount step device of FIGS. 3A and 3B mounted thereon, as well as a user accessing the boat via the bow mount step device.

Each of mounting brackets 470 are preferably comprised of a flat bar or plate with a plurality of spaced apart continuous openings 472 therein for receipt of fasteners 474. More specifically, and as depicted in FIGS. 3A and 3B, one of mounting brackets 470 is preferably fixedly attached to the underside of cross beam 440, preferably at the midpoint between first end 441 and second end 442, by any common means known in the art such as welding. The presence of a first mounting bracket 470 on the underside of cross beam 440 also serves to keep the cross beam somewhat elevated above frame tongue 16. When cross beam 440 is being attached to frame tongue 16, first mounting bracket 470 and cross beam 440 rest on the top surface 17 of frame tongue 16 and the opposing second mounting bracket 470 is positioned beneath frame tongue 16, as shown in FIG. 3B, and fasteners 474 are inserted into corresponding openings 472 in each of mounting brackets 470 and secured with nuts 476. FIG. 7 illustrates a perspective view of the prior art boat trailer 10 of FIG. 1 with a boat 200 and the bow mount step device of FIGS. 3A and 3B mounted thereon, as well as a user accessing the boat 200 via the bow mount step device.

Having described the overall structure of a preferred embodiment of bow mount step device, its use and usefulness will now be summarized. A user 300 desiring to access a prior art boat 200 from the bow could simply place his or her foot 310 on either of step portions 160, and climb up into the boat 200. Further, because in a first preferred embodiment of the present invention, bow mount step device 100 has two step portions 160 (i.e., one step portion on each side of the bow), the user may elect to board boat 200 from either side of the bow. Further, user 300 can de-board boat 200 in a similar fashion.

Accordingly, the bow mount step device 100 of the present invention eliminates the problems and hazards associated with trying to board or de-board a boat from the bow portion. The bow mount step device 100 can be securely attached to the top of an existing frame tongue, or can be integrally formed with a newly manufactured boat trailer. Finally, the bow mount step device 100 is relatively inexpensive to manufacture, and safe and easy to use.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A step device for a boat trailer comprising:
a neck portion;
a cross beam attached to said neck portion, wherein said cross beam is comprised of a first end and a second end;
a first step extending outwardly from said first end of said cross beam;
a second step extending outwardly from said second end of said cross beam;
a mounting bracket, wherein said mounting bracket is further comprised of a channel for receipt of a portion of a winch post of said boat trailer; and
a fastening means.

2. A step device for a boat trailer comprising:
a neck portion;
a cross beam attached to said neck portion, wherein said cross beam is comprised of a first end and a second end;
a first step extending outwardly from said first end of said cross beam;
a second step extending outwardly from said second end of said cross beam;
a mounting bracket, wherein said mounting bracket is further comprised of a channel for receipt of a portion of a frame tongue of said boat trailer; and
a fastening means.

3. A step device for a boat trailer comprising:
a neck portion;
a cross beam attached to said neck portion, wherein said cross beam is comprised of a first end and a second end;
a first step extending outwardly from said first end of said cross beam;
a second step extending outwardly from said second end of said cross beam;
a mounting bracket comprised of a first channel for receipt of a portion of a winch post of said boat trailer and a second channel for receipt of a portion of a frame tongue of said boat trailer; and
a fastening means.

4. The step device of claim 3 wherein said fastening means is comprised of at least one fastener.

5. The step device of claim 3 wherein said fastening means is comprised of at least one weld.

* * * * *